United States Patent
Roozbeh et al.

(10) Patent No.: US 11,714,753 B2
(45) Date of Patent: Aug. 1, 2023

(54) METHODS AND NODES FOR HANDLING MEMORY

(71) Applicant: Telefonaktiebolaget LM Ericsson (publ), Stockholm (SE)

(72) Inventors: Amir Roozbeh, Stockholm (SE); Alireza Farshin, Stockholm (SE); Dejan Kostic, Solna (SE); Gerald Q Maguire, Jr., Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 203 days.

(21) Appl. No.: 17/309,657

(22) PCT Filed: Dec. 13, 2018

(86) PCT No.: PCT/SE2018/051311
§ 371 (c)(1),
(2) Date: Jun. 11, 2021

(87) PCT Pub. No.: WO2020/122779
PCT Pub. Date: Jun. 18, 2020

(65) Prior Publication Data
US 2022/0058123 A1 Feb. 24, 2022

(51) Int. Cl.
*G06F 12/0806* (2016.01)
(52) U.S. Cl.
CPC ...... *G06F 12/0806* (2013.01); *G06F 2212/62* (2013.01)
(58) Field of Classification Search
CPC .. G06F 12/084; G06F 9/5016; G06F 12/0806; G06F 12/0846; G06F 12/0811; G06F 2212/62; Y02D 10/00
(Continued)

(56) References Cited

U.S. PATENT DOCUMENTS

2008/0055617 A1  3/2008  Savagaonkar
2009/0300269 A1* 12/2009  Radke ............... G06F 12/0246
                                    711/E12.008
(Continued)

OTHER PUBLICATIONS

International Search Report and Written Opinion for Application No. PCT/SE2018/051311, dated Oct. 4, 2019, 14 pages.
(Continued)

*Primary Examiner* — Hashem Farrokh
(74) *Attorney, Agent, or Firm* — Nicholson De Vos Webster & Elliott LLP

(57) ABSTRACT

A method in a multi-core processing system which comprises a processor comprising at least a first and a second processing unit, a cache, common to the first and the second processing unit, comprising a first cache portion associated with the first processing unit and a second cache portion associated with the second processing unit, a memory, comprising a first memory portion associated with the first cache portion and a second memory portion associated with the second cache portion. The method comprises detecting that a data access criteria of the second memory portion is fulfilled, establishing that first data stored in the second memory portion is related to a first application running on the first processing unit, allocating at least a part of the first memory portion to the first application based on cache information, and migrating the first data to the part of first memory portion.

20 Claims, 13 Drawing Sheets

(58) Field of Classification Search
USPC .......................................................... 711/118
See application file for complete search history.

(56) References Cited

U.S. PATENT DOCUMENTS

2017/0286298 A1* 10/2017 Geetha ................ G06F 12/0811
2018/0329819 A1    11/2018 Hagersten et al.
2019/0018808 A1*  1/2019 Beard ................. G06F 12/0826

OTHER PUBLICATIONS

Xiao Zhang et al., "Towards Practical Page Coloring-based Multi-core Cache Management," 2009, pp. 89-102, EuroSys '09, Nuremberg, Germany.

Klaus Danne, "Memory Management to Support Multitasking on FPGA Based Systems," 2004, 10 pages, Heinz Nixdorf Institute, University of Paderborn, Germany.

Ludan Zhang et al., "Lightweight Dynamic Partitioning For Last Level Cache Of Multicore Processor On Real System," 2012, pp. 33-38, 2012 13th International Conference on Parallel and Distributed Computing, Applications and Technologies, IEEE.

Farrukh Hijaz et al., "Locality-aware data replication in the last-level cache for large scale multicores," 2016, 35 pages, Springer Science+Business Media, New York.

Xiaodong Wang et al., "SWAP: Effective Fine-Grain Management of Shared Last-Level Caches with Minimum Hardware Support," 2017, pp. 121-132, 2017 IEEE International Symposium on High Performance Computer Architecture, IEEE.

Zhipeng Wei et al., "Cracking Intel Sandy Bridge's Cache Hash Function," 2015, 13 pages, Institute of Computing Technology, Chinese Academy of Sciences.

International Preliminary Report on Patentability, PCT App. No. PCT/SE2018/051311, dated Jun. 24, 2021, 11 pages.

Newton et al., "DAAIP: Deadblock Aware Adaptive Insertion Policy for High Performance Caching," Nov. 5, 2017, pp. 345-352, 2017 IEEE 35th International Conference on Computer Design.

Supplementary European Search Report and Search Opinion, EP App. No. 18943039.0, dated Jun. 13, 2022, 13 pages.

* cited by examiner

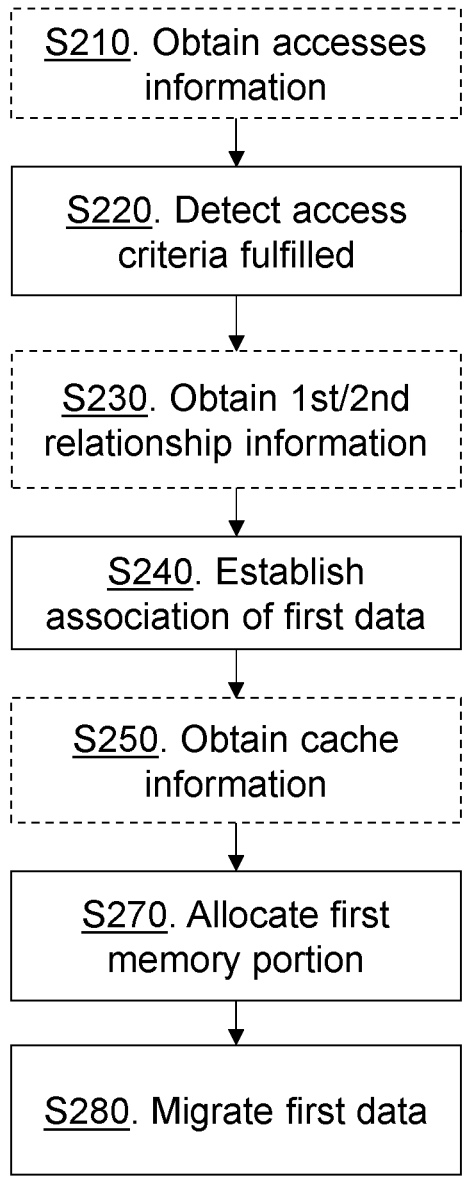
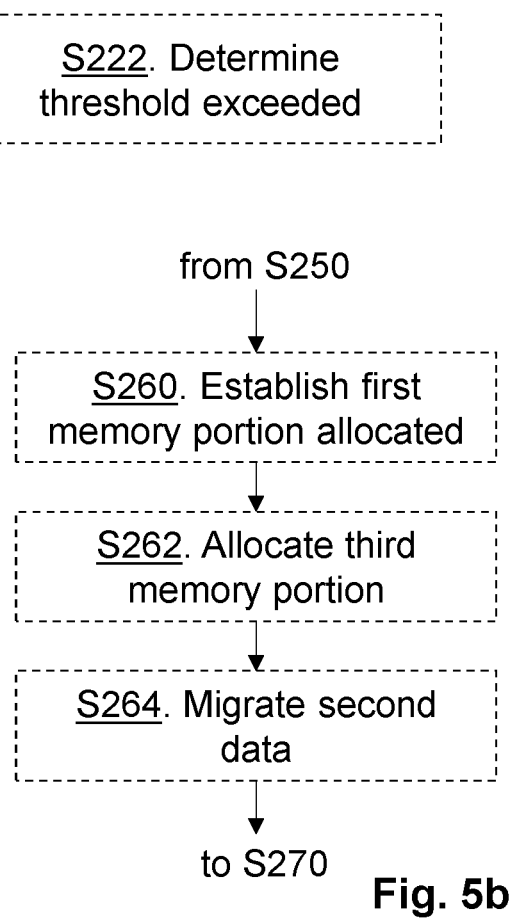
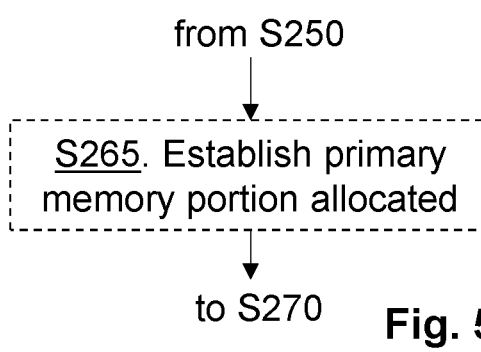
Fig. 5a
Fig. 5b
Fig. 5c

METHODS AND NODES FOR HANDLING MEMORY

CROSS-REFERENCE TO RELATED APPLICATIONS

This application is a National stage of International Application No. PCT/SE2018/051311, filed Dec. 13, 2018, which is hereby incorporated by reference.

TECHNICAL FIELD

The proposed technology relates to methods and nodes for handling memory in a multi-core processing system. Furthermore, computer programs, computer program products, and carriers are also provided herein.

BACKGROUND

To greatly simplify, a computer system comprises one or more processing units (PUs), such as central processing units (CPUs), connected to a memory. When two or more independent PUs are included in the processor, the PUs are generally called "cores" and the processor is referred to as a multi-core processor. The PU fetches instructions and data from a specific depository on the processor chip, known as a cache memory, or simply a "cache". A cache comprises very fast Static Random Access Memory (static RAM or SRAM) which is an expensive resource, but enabling rapid access to the stored information. To deal with the cost issue, the computer system's memory is organized in a hierarchical structure, additionally including cheaper and slower memory such as Dynamic RAM (DRAM), generally referred to as the main memory, and non-volatile memory and/or local storage, generally referred to as the secondary memory. In modern processors, the cache is also implemented in a hierarchal manner, e.g., a Layer one cache (L1), a Layer two cache (L2), and a Layer 3 cache (L3)—aka the Last Level Cache (LLC). The L1 and L2 cache are private to each core while the LLC is in often shared among all PU cores. The processor keeps recently used data in the cache to reduce the access time to the data. When the requested data is not available in any level of the cache, the data will be loaded from the main memory into the PU cache.

As indicated above, the access latency to the data in the different levels of the memory hierarchy is different. As an example, fetching a data from the L1 cache may cost around 4 CPU cycles, meaning around 1.2 ns in a CPU with a 3 GHz clock cycle, while accessing a data from the main memory, e.g. a DRAM, may cost around 200 CPU cycles, thus being about 60 ns for this CPU. This means accessing a data stored in the main memory can be almost 50 times more expensive compared to the L1 cache.

In some processor architectures, the LLC is divided into multiple portions, so called slices. The PU cores and all LLC slices are interconnected, e.g., via bi-directional ring bus or mesh, and hence all slices are accessible by all cores. The particular slice in which a main memory location is cached, i.e., in which slice a copy of an instruction or data stored in the main memory is placed, is in many cases determined by applying an algorithm to the address of the main memory location. A PU can then access and fetch the required instruction or data in the slice by use of the interconnect.

While this procedure provides an even balance on the slices, it does not consider latency requirements for individual applications executing on the processor cores. It would furthermore be advantageous to provide optimizations to the processing system that are application-agnostic, so that the application is not aware of, or needs to be adapted to, the underlying changes of the system.

SUMMARY

It is an object of the present disclosure to provide methods and nodes for solving or at least alleviating, at least some of the problems described above.

This and other objects are met by embodiments of the proposed technology.

According to a first aspect, there is provided a method for handling memory in a multi-core processing system. The processing system comprises a processor comprising at least a first and a second processing unit, a cache, common to the first and the second processing unit, comprising a first cache portion associated with the first processing unit and a second cache portion associated with the second processing unit, a memory, comprising a first memory portion associated with the first cache portion and a second memory portion associated with the second cache portion. The method comprises detecting that a data access criteria of the second memory portion is fulfilled, establishing that first data stored in the second memory portion is related to a first application running on the first processing unit, allocating at least a part of the first memory portion to the first application based on cache information, and migrating the first data to the at least part of first memory portion.

According to a second aspect, there is provided a processing system comprising a processor comprising at least a first processing unit and a second processing unit, a cache, common to the first processing unit and the second processing unit. The cache comprises a first cache portion associated with the first processing unit and a second cache portion associated with the second processing unit. The processing system further comprises a memory, comprising a first memory portion associated with the first cache portion and a second memory portion associated with the second cache portion. The processing system configured to detect that a data access criteria of the second memory portion is fulfilled, establish that first data stored in the second memory portion is related to a first application running on the first processing unit, allocate at least a part of the first memory portion to the first application based on cache information, and migrate the first data to the at least part of the first memory portion.

According to a third aspect, there is provided a computer program comprising instructions which, when executed by at least one processor causes the at least one processor to perform the method of the first aspect.

According to a fourth aspect, there is provided a computer program product comprising a computer-readable medium having stored there on a computer program of according to the third aspect.

An advantage of the proposed technology disclosed according to some embodiments herein is that latency requirements for individual applications may be fulfilled. Another advantage of some embodiments is that the resources of the processing system are used in a more efficient way, e.g., with regards to the load on individual components of the system and its energy consumption.

BRIEF DESCRIPTION OF THE DRAWINGS

Examples of embodiments herein are described in more detail with reference to attached drawings in which:

FIG. 5a shows a flow diagram depicting processing performed by a processing system in accordance with some aspects described herein;

FIG. 5b shows a flow diagram depicting further processing performed by a processing system in accordance with some aspects described herein;

FIG. 5c shows a flow diagram depicting further processing performed by a processing system in accordance with some aspects described herein;

DETAILED DESCRIPTION

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout. Any step or feature illustrated by dashed lines should be regarded as optional.

The technology disclosed herein relate to methods and nodes suitable for handling memory in a processing system including a processor comprising several processing units, or so called "cores", and the processor is therefore generally referred to as a multi-core processor. An application running in such a multi-core processing system may make use of more than one of the cores to enhance the speed of execution of its program code, if the program is adapted to such parallel computing of the instructions contained therein. As mentioned above, the processing system's memory resources are most often arranged in a memory hierarchy, ranging from small volume, but fast memory, easily accessible to the processing units, to large volume storage which is significantly slower and with long access times to data and instructions stored therein.

Figure 1:
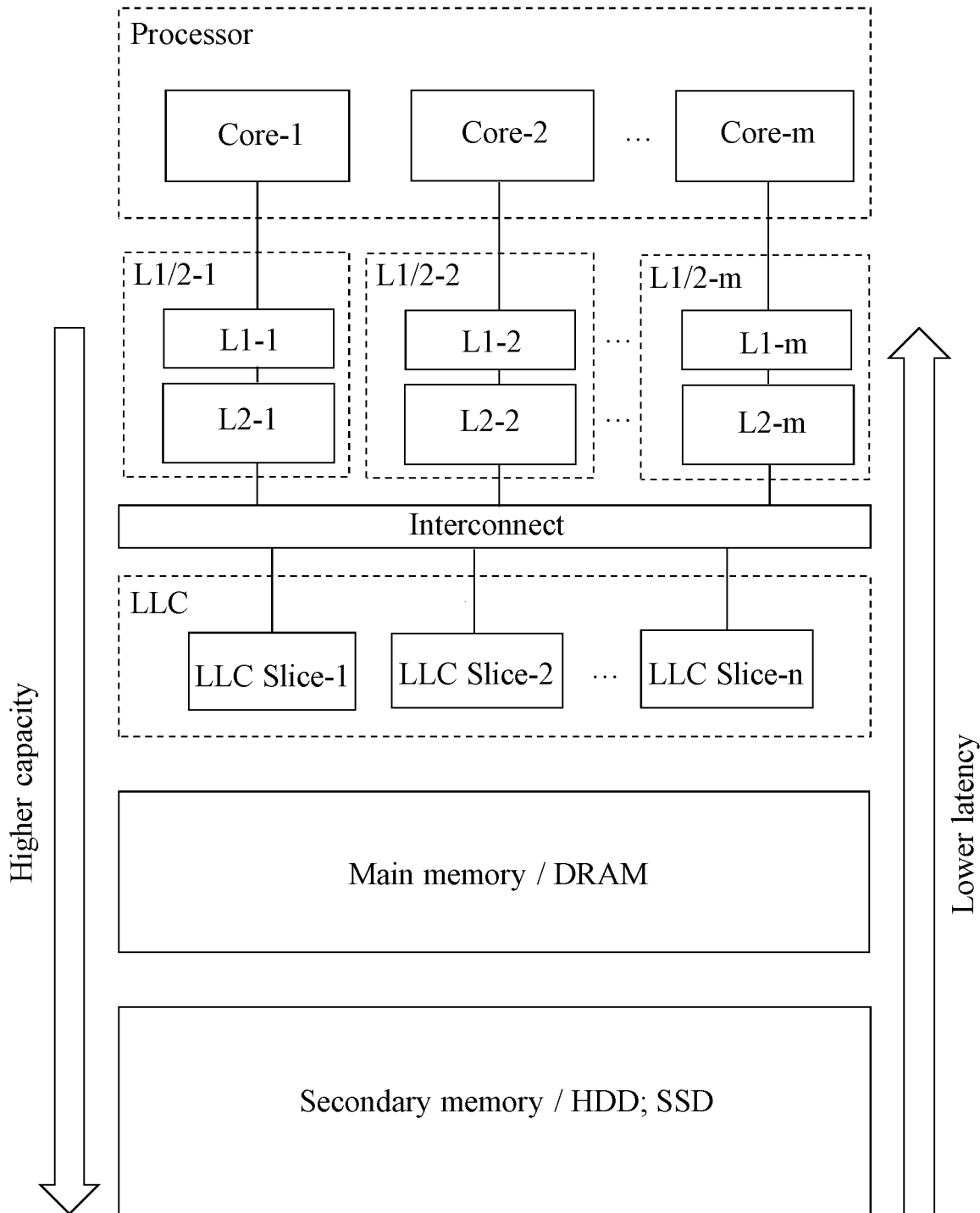
FIG. 1 is a schematic block diagram illustrating a multi-core processing system.

FIG. 1 illustrates schematically an exemplary multi-core processing system, including a processor being a multi-core processor, comprising a number of processing units, in this example comprising Core-1, Core-2, and up to a number of m cores, hence the collection of cores ending with Core-m. FIG. 1 further schematically illustrates a memory hierarch as previously described. In this example, the system has a three layered cache structure comprising Layer 1 and Layer 2 caches which are private to the individual cores, i.e., not shared with the other cores of the processor, hence Core-1 is connected to the L1 cache and the L2 cache of the structure L1/2-1, Core-2 is connected to the L1 cache and L2 cache of L1/2-2, etc., up to Core-m, thus being connected to the L1 cache and the L2 cache of L1/2-m. Further illustrated is the slicing of the shared cache layer, which herein after is referred to as the Cache or the shared cache, in this example being the L3 cache of the cache structure, and also being the Last Level Cache, as it is the highest layer in the three layered cache structure. The cache comprises LLC Slice-1, LLC Slice-2, etc., up to n LLC slices, i.e. LLC Slice-n. The slices of the cache are accessible to all the cores via an interconnect (e.g., ring bus or mesh), and as mentioned, the slices are shared between the n cores. Notably, m and n may have the same value or different values. The number of slices may, e.g., exceed the number of cores.

Below the layered cache structure is what is generally called the main memory, comprising comparatively large volume of volatile memory, herein after referred to as the Memory. The memory hierarchy in this example ends with the secondary memory, which in general may comprise one or more Hard Disc Drives (HDDs) and/or Solid State Drives (SSDs), and thus being a non-volatile memory type. FIG. 1 further indicates a relative latency for accessing data and instruction of the different levels in the memory hierarchy, as well as indicating the relative storage capacity. As mentioned above, the memory technology of the L1, L2, and L3 caches is often of the Static Random Access Memory type and the main memory of the Dynamic Random Access Memory type.

Due to the differences in, e.g., physical distance between a processing unit and different portions of the cache, for instance different LLC slices, it has been appreciated that the accessing time for fetching data from the cache portions may differ. Thus, depending on to which cache portion the needed data is loaded, i.e., copied from the memory, the time for fetching the data may be shorter or longer for a specific core. It has further been appreciated in the present disclosure that this difference in access time may be used to optimize the system, for example, by determining, or creating, an association between a processing unit and a portion of the cache. As an example, if an application is running on core 1, and reading and writing a data from/to slice 1 is faster than from, e.g., slice 2 to slice 8, assuming a CPU socket with eight cores, an association may be determined, or created, between core 1 and slice 1.

The time required for a processing unit to fetch data from a specific cache portion may be determined by measurements. Thus, the access times between a PU and one or more of the cache portions may be determined. Such measurements may also be performed for multiple, or even all PUs in the processing system. As an example, the measurements may be conducted at start-up of the system. Alternatively or additionally, such measurements may be performed at a certain point(s) or intervals of an up-and-running processing system.

An association between a processing unit and a cache portion may hence be created, for example, by a procedure comprising performing access time measurements.

It may further be noted that an association between a processing unit and a cache portion may change during run-time. As an example, the association may change in a scenario wherein a first LLC slice and a second LLC slice are both preferable for CPU Core 1. At some point the first LLC slice is associated to core 1. Assume that for another core, e.g., core 2, the only preferable LLC slice is also the first LLC slice. In a situation when core 2, e.g., starts running a high priority application or data related to the application is accessed at a high rate, leading to fulfillment of the access criteria, then core 1's association to the first LLC slice may change to the second LLC slice and instead core 2 is associated with the first LLC slice.

In some systems, a portion, e.g., a block, of the memory is allocated to a process at the initialization time and is later expanded by allocating more memory if needed. However, it is difficult to optimize such systems when the behavior of the application changes at runtime, for example when it migrates from one CPU core to another CPU core.

Figure 2:
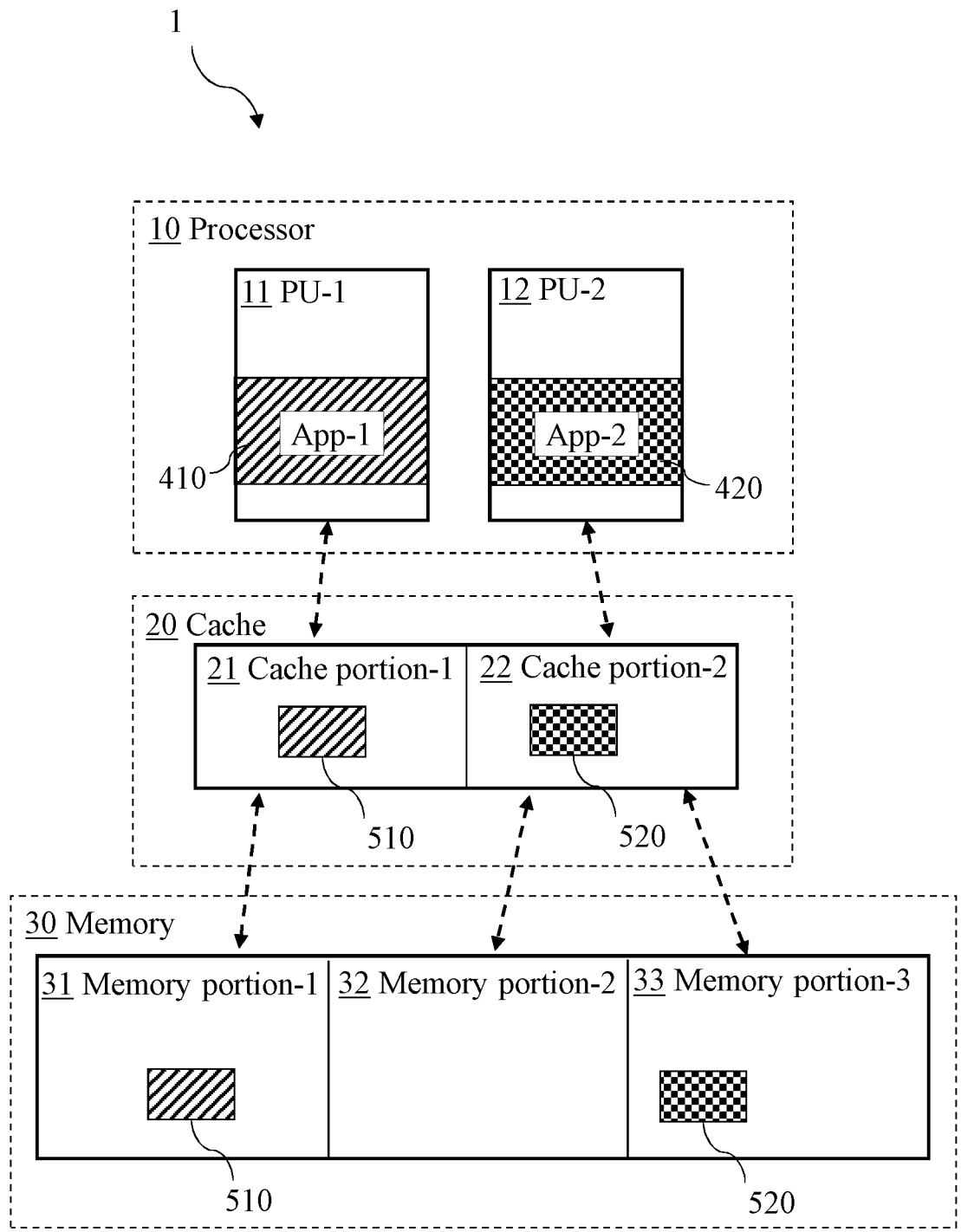
FIG. 2 is a schematic block diagram illustrating an exemplary processing system in accordance with one or more aspects described herein.

FIG. 2 illustrates schematically an exemplary processing system for handling memory in a multi-core processing system according the technology presented herein. The exemplary processing system 1 comprises a processor 10 comprising a first processing unit 11 and a second processing unit 12. The processing system further comprises a cache 20, which is common to the first processing unit 11 and the second processing unit 12. In other words, the cache 20 is shared between the first unit 11 and the second processing unit 12, hence both units may read and write data to the cache 20. The cache 20 also comprises a first cache portion 21 associated with the first processing unit 11 and a second cache portion 22 associated with the second processing unit 12. This association may for example mean that the first processing unit 11, at least primarily, fetches, i.e., reads, data and instructions for execution from the first cache portion 21. In FIG. 2 this association is illustrated by a dashed arrow between Cache portion-1 21 and PU-1 11. Similarly, a dashed arrow indicates the association between Cache portion-2 22 and PU-2 12. The memory 30 of the processing system 1 comprises a first memory portion 31 associated with the first cache portion 21 and a second memory portion 32 associated with the second cache portion 22. The associations between these portions are indicated by a dashed arrow between Memory portion-1 31 and Cache portion-1 21, and between Memory portion-2 32 and Cache portion-2 22, respectively. Schematically illustrated is also that a first application App-1 410 is running on the PU-1 11, and further illustrates that first data 510, required by the PU-1 11 for executing the program of App-1 410, has been copied from a memory portion-1 31 in memory 30 to the associated cache portion-1 21.

In this context, data also includes, e.g., instructions or other data necessary for running the application on the processing unit is included in the first data 510.

A cache portion as used herein, refers to a part of the cache 20, for example one or more LLC slices, however, not necessarily adjacent to each other.

Figure 3:
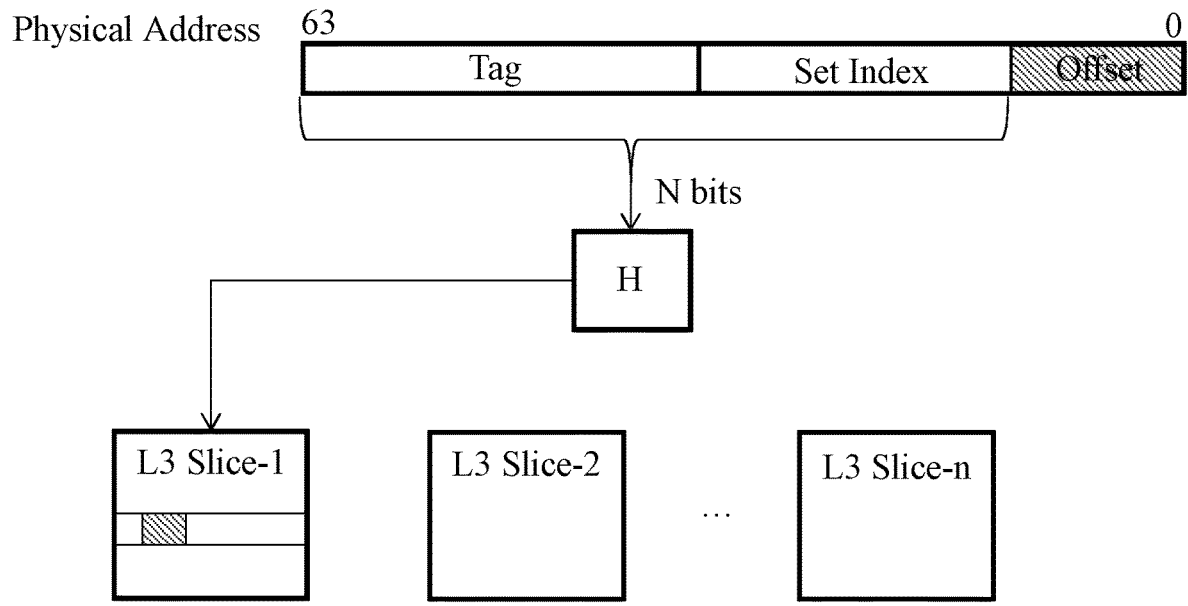
FIG. 3 is a schematic block diagram illustrating details of an exemplary processing system in accordance with one or more aspects described herein.

The association between a memory portion and cache portion may for example be realized by the procedure in which data present in the memory is copied into the cache. FIG. 3 illustrates schematically that the physical address of the main memory in which the data is stored defines to which slice in the LLC the data will be loaded. For example, an algorithm such as a hash function may be used to map and distribute the main memory physical addresses into different slices. The algorithm receives the physical address as an input and defines to which slice that particular address should be loaded. The top part of FIG. 3 demonstrates the address of one memory portion, such as a memory block, in a system with 64-bit memory address space. Assuming an application running on one PU core requests memory at its start time, the system will allocate a memory portion from the available memory. The allocated memory portion will have a physical address A, A being a 64-bit binary. Assuming further that the application stores some data at address A, then, when the application needs the data stored on that physical address A during its execution, the application and consequently the PU will send a request to the system to fetch the data from the main memory, provided that the needed data is not available in cache. For example, when the distribution is defined by a hash function, H, the system may send N bits of a physical address of A into the hash function and the output of the function defines to which slice the data from that address should be copied.

Figure 4:
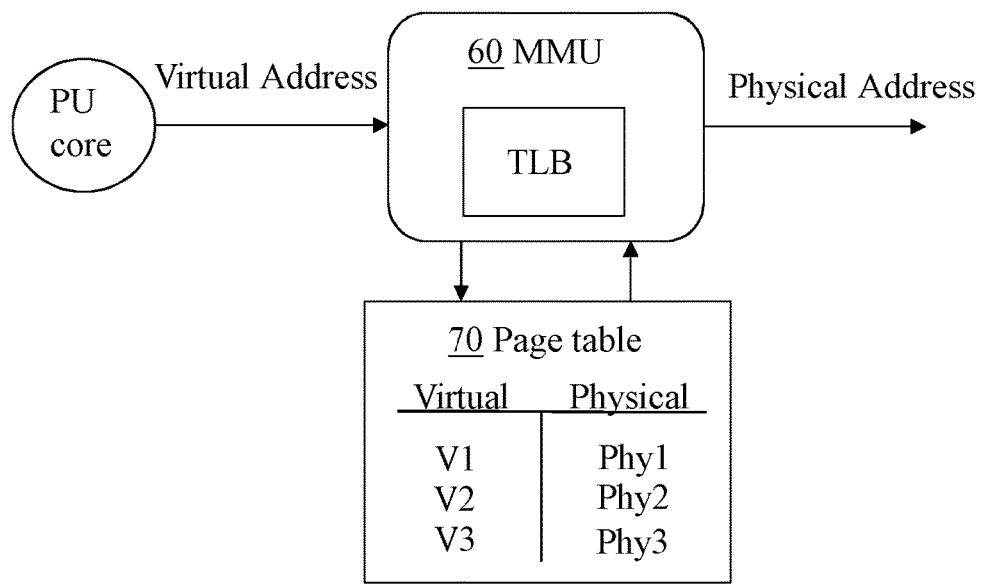
FIG. 4 is a schematic block diagram illustrating memory addressing in processing systems.

In a modern systems, the applications and the operating system (OS) use a virtual memory address space rather than physical memory address space. One goal of the virtual memory technique is to reduce a complexity of memory addressing for applications and making an application think that it has more memory than physically exists. FIG. 4 illustrates schematically the translation of virtual addresses to physical addresses. There is an entity, e.g., memory management unit (MMU) 60, which is in charge of translating the virtual memory address, used by the application and the OS to access data, into the physical memory address, i.e., the actual address of the data in the main memory.

In a virtual memory implementation, when a process executing on a processing unit requests access to its memory, the MMU utilizes the operating system's page table 70 to map the virtual address requested by the process, which address is also unique to the accessing process, to the physical address, being unique to the PU. The page table is where the operating system stores its mappings of virtual addresses to physical addresses. When the PU gets information regarding translation between virtual to physical addresses, it stores the mapping information in its Translation Lookaside Buffer (TLB) as long as possible. By this means, next time the process requests the same data the MMU will use information in its TLB, if it still exists in TLB, rather than doing a costly translation through OS's page table.

Turning now to FIG. 5a, and with further reference to FIG. 2, a method performed by a processing system in accordance with some aspects will now be described. The method for handling memory is performed in a processing system 1 comprising a processor 10, which comprises at least a first processing unit 11 and a second processing unit 12. The processing system 1 further comprises a cache 20, which is common to the first processing unit 11 and the second processing unit 12. The cache 20 comprises a first cache portion 21 associated with the first processing unit 11 and a second cache portion 22 associated with the second processing unit 12. The processing system 1 also comprises a memory 30, e.g., a main memory, which comprises a first memory portion 31 associated with the first cache portion 21 and a second memory portion 32 associated with the second cache portion 22. The flow diagram of FIG. 5a depicts steps performed by the processing system 1. In step S220 of the method it is detected that a data access criteria of the second memory portion 32 is fulfilled. In a further step S240 it is established that first data 510 stored in the second memory portion 32 is related to a first application 410 running on the first processing unit. Based on cache information, at least part of the first memory portion 31 is allocated to the first application 410 in step S270. Step S280 comprises migrating the first data 510 to the at least part of the first memory portion 31.

As discussed previously, data that is not present in the cache when the data is required by the processing unit, will need to be fetched from the main memory and copied to the cache. Some portions of the memory, e.g., certain address ranges of the physical memory, may be accessed repeatedly during the execution of a program, while other are hardly accessed at all. Depending on for example the type of application, or the stage of the program execution, such as at start-up of an app or when the app is up-and-running and providing services to its user, the time to access data in the memory may have more or less effect on the program execution. Furthermore, different applications running on a processing system may for example have different priorities or expected, or agreed, quality of the services provided by the applications. The above type of information relating to a memory portion and/or an application may be used for defining a data access criteria.

A relation of the first data 510 to the first application 410 may be the first processing unit's need of obtaining the first data 510 for running the first application 410. Alternatively or additionally, said relation may be that the first data 510 is stored in a memory portion in the memory 30 that is allocated to the first application 410. Information for establishing such relation may in some examples below be referred to as relationship information.

As an option, the method may further comprise a step S250 of obtaining cache information, which information comprises the above discussed association between the first memory portion 31 and the first cache portion 21, and the association between the first processing unit 11 and the first cache portion 21.

As a further option, the method comprises obtaining in step S230 at least one of first relationship information, comprising a relationship between the first application 410 and the first data 510, and second relationship information, comprising a relationship between the first application 410 and the first processing unit 11. In this case the establishing in S240, that first data 510 stored in the second memory portion 32 is related to a first application 410 running on the first processing unit, is based on one or both of the first relationship information and the second relationship information.

The method may also comprise step S210 which includes obtaining access information relating to the second memory portion 32. The detecting in S220 that a criteria is fulfilled, is then based on the access information. In this step, the method may optionally also include that the detecting in S220 that a criteria is fulfilled, comprises a step of determining S222 that the accesses information exceeds a threshold value.

Whether or not the step S222 is included in the method, the access information may comprise an indication of a frequency of access to the first data 510 stored in the second memory portion 32.

As a further option, the access information may comprise an indication of a frequency of access to the first data 510 stored in the second memory portion 32. The step S220 of detecting that a data access criteria of the second memory portion 32 is fulfilled then comprises determining S222 that the indicated frequency of accesses exceeds a threshold value.

The above mentioned access information may as an example indicate a required latency limit associated with the first data 510.

As yet an option the method may further comprise steps illustrated in FIG. 5b, further referring to FIG. 2. In S260 it is established that the first memory portion 31 is allocated to a second application 420 running on the second processing unit 12. Step S262 comprises allocating a third memory portion 33 to the second application 420 and in step S264 second data 520 related to the second application 420 is migrated to the third memory portion 33. In this case, the third memory portion 33 may be associated with the second cache portion 22, as indicated by a dashed arrow between Memory portion-3 33 and Cache portion-2 22.

Figure 6:
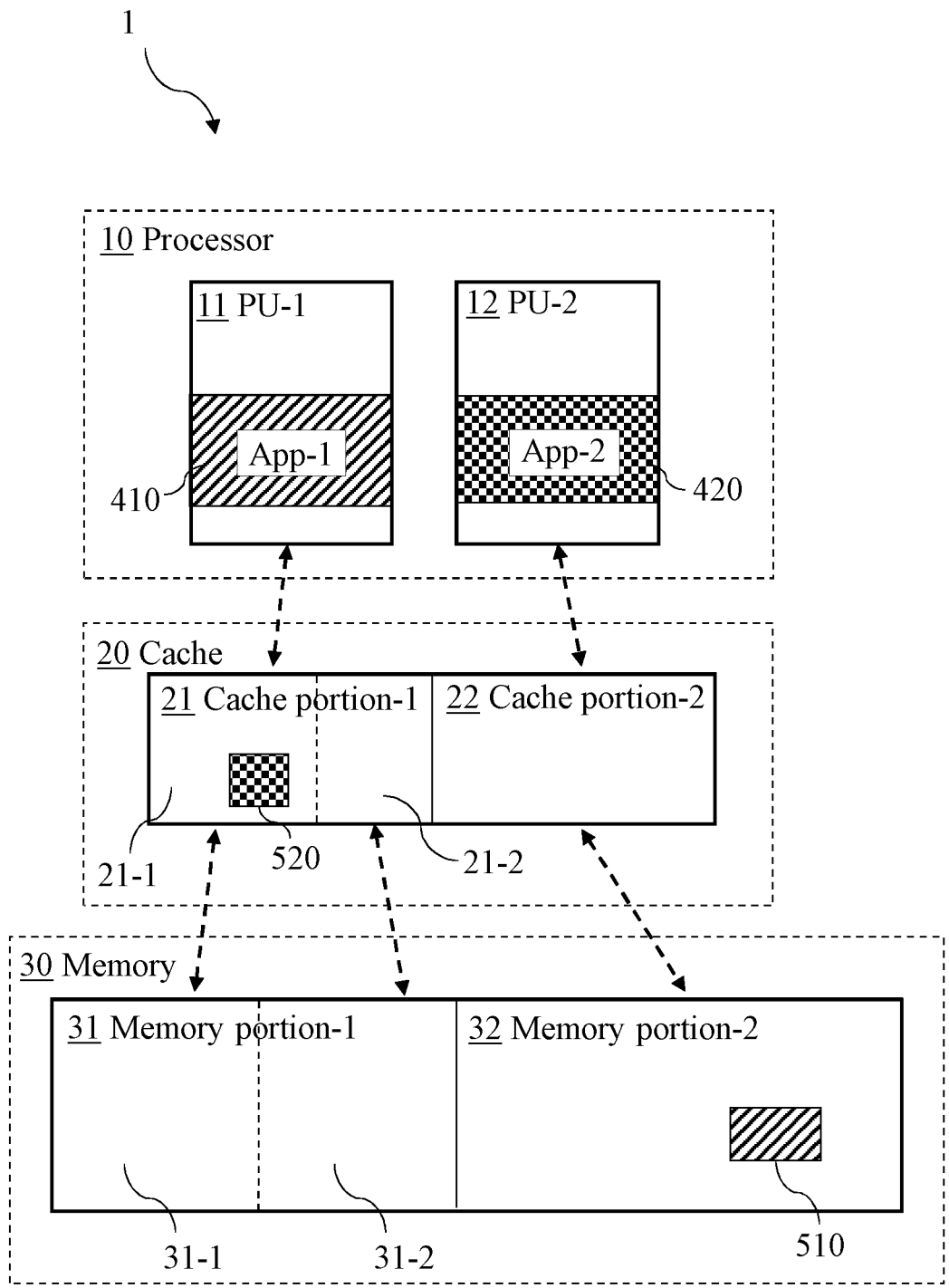
FIG. 6 is a schematic block diagram illustrating an exemplary processing system in accordance with one or more aspects described herein.

One or more of the cache portions may further comprise sub-portions or parts. For example, as illustrated in FIG. 6, the first cache portion 21 comprises a primary cache portion 21-1 associated with a primary memory portion 31-1 of the first memory portion 31, and a secondary cache portion 21-2 associated with a secondary memory portion 31-2 of the first memory portion 31. The method may then further comprise a step S265 shown in FIG. 5c which comprises establishing that the primary memory portion 31-1 is allocated to a second application 420 running on the second processing unit 12. In S270 the secondary memory portion 31-2 is in this case allocated to the first application 410, based on cache information, and in S280 the first data 510 is migrated to the secondary memory portion 31-2.

The method described above may for example be performed by an accelerator function 50 comprised in the processing system 1. Details of this function will be described further below.

Figure 7:
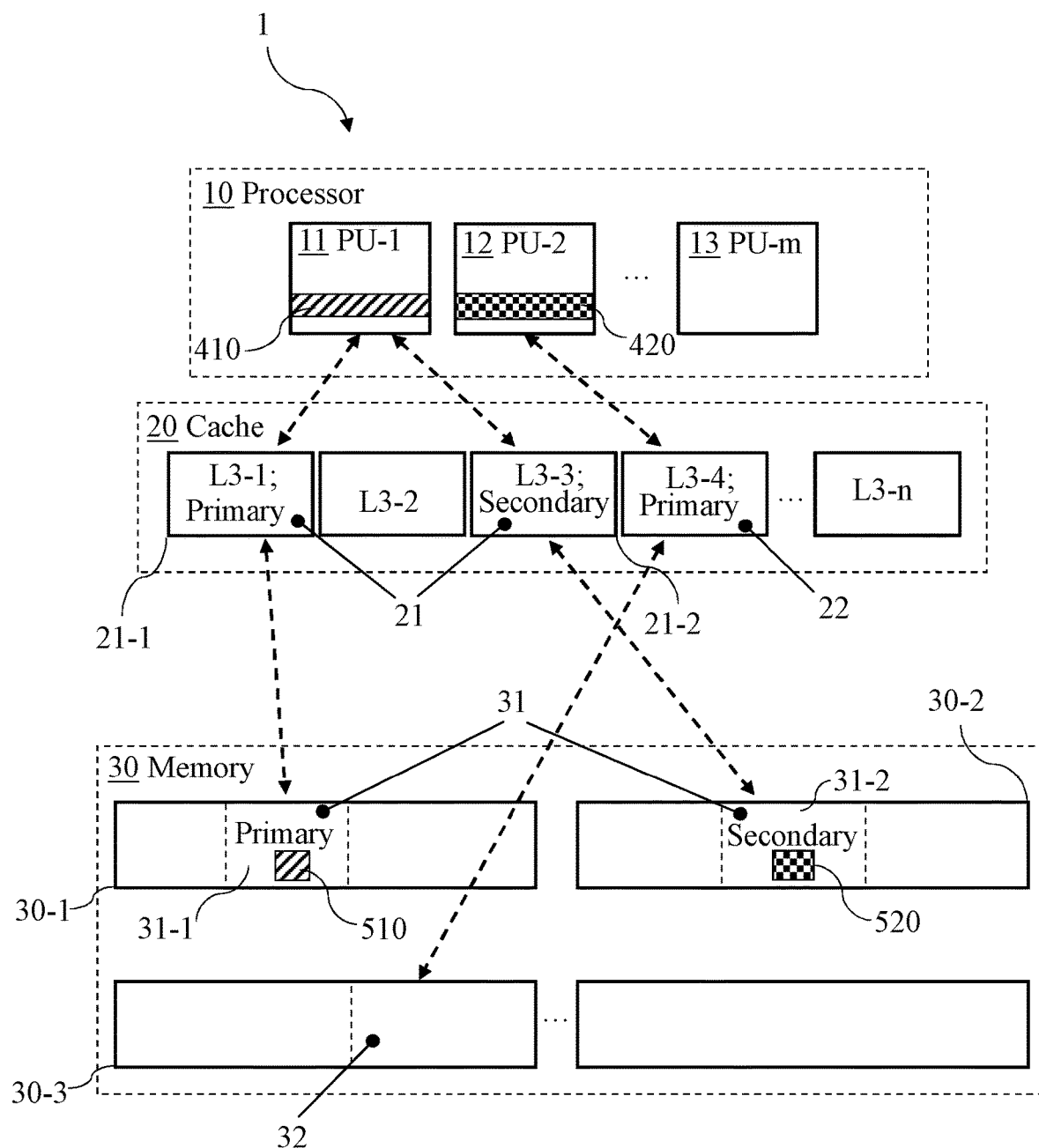
FIG. 7 is a schematic block diagram illustrating a further exemplary processing system in accordance with one or more aspects described herein.
Figure 8:
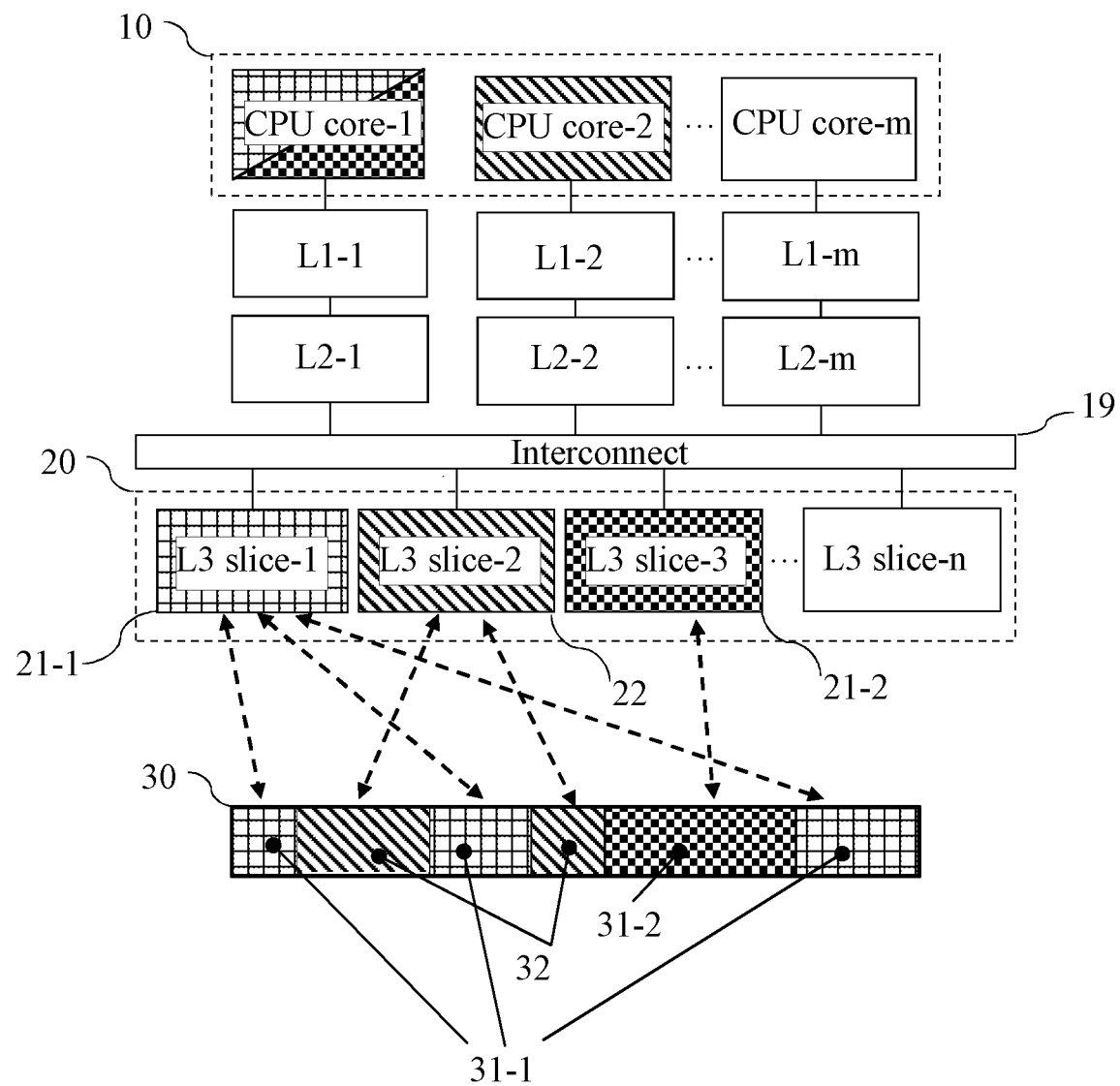
FIG. 8 is a schematic block diagram illustrating a further details of an exemplary processing system in accordance with one or more aspects described herein.

FIG. 7 and FIG. 8 shows additional details in accordance with one of more aspects of the proposed technology, by way of further exemplary processing systems. The processing system 1 of FIG. 7 comprises PU-1 11, PU-2 12 up tom PUs, hence the last PU is PU-m 13. As can be seen in FIG. 7, the first processing unit PU-1 11 is associated with cache portion 21, comprising a primary cache portion 21-1 denoted L3-1 and a secondary cache portion 21-2 denoted L3-3. The primary cache portion 21-1 and the secondary cache portion 21-2 may for example each be an LLC slice, which in this example are not adjacent each other. Further illustrated is an association between the sub-portions of memory portion 31, i.e., the primary memory portion 31-1 and a secondary memory portion 31-2, of the memory 30 and the above mentioned respectively sub-portion of cache portion 21. As seen, the primary memory portion 31-1 and a secondary memory portion 31-2 are schematically illustrated to be separated from each other in the memory 30. Thus, the primary memory portion 31-1 is located in a part of the memory 30, e.g., a memory module 30-1, and the secondary memory portion 31-2 is located in another part of the memory 30, e.g., a memory module 30-2. Also shown is a further memory portion 32 located in memory module 30-3, having no sub memory portions, associated with the second cache portion 22, denoted L3-4, and second cache portion 22 being associated with the second processing unit 12, denoted PU-2. The exemplary system shows first data 510 related to a first application 410 running on PU-1 11, and second data 520 related to a second application 420 running on PU-2 12. In this example, the first data 510 may thus be considered to be located in a suitable part of the memory 30, and migrating the first data 510 to another location in the memory 30 will likely not improve performance of the first application 410. However, migrating the second data 520 from its current location to the suitable location in the second memory portion 32, would be an action most likely to enhance performance of the second application 420.

The further exemplary processing system of FIG. 8 illustrates an optimized system, wherein a primary memory portion 31-1 comprises separate parts which are located at different addresses in the memory 30. Associations between the PUs and the cache portion has however been omitted for clarity reasons, and instead indicated by different patterns in the figure. Hence, first data requested by CPU core-1 located in any of the three parts of the primary memory portion 31-1 will be copied into the associated primary cache portion, L3 slice-1. Similarly, second data related to the second application running on CPU core-2, located in any of the two parts of the second memory portion 32, will be copied to the associated second cache portion, L3 slice-2. It can further be noted that the CPU core-1 is also associated with a secondary cache portion, L3 slice-3, and a secondary memory portion 31-2 is associated with L3 slice 3.

Figure 9:
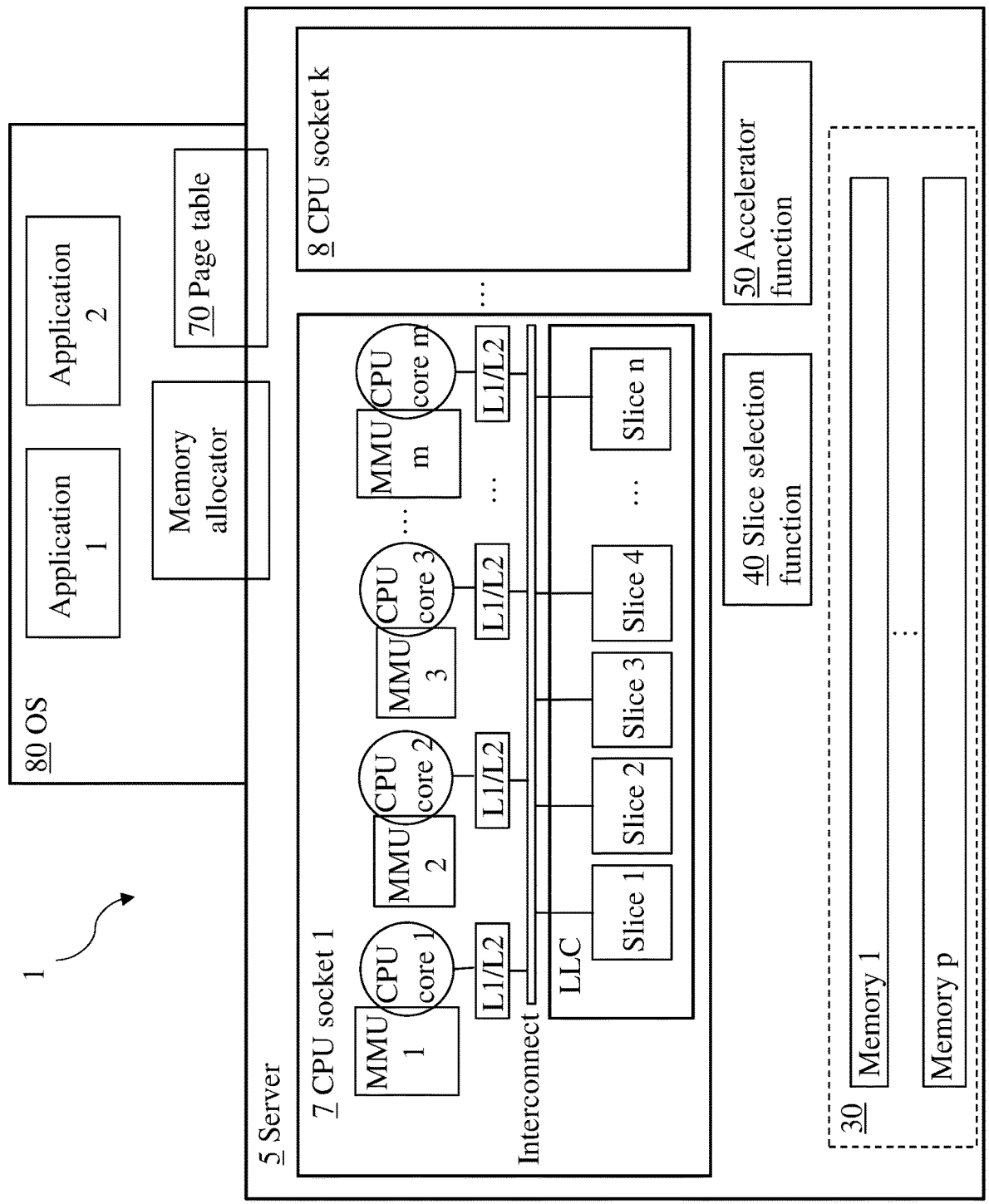
FIG. 9 is a schematic block diagram illustrating a further exemplary processing system in accordance with one or more aspects described herein.

FIG. 9 illustrates schematically an exemplary processing system 1 in accordance with the proposed technology. A server 5 built from a number of CPU sockets 7; 8 and main memory 30, which may be mainly DRAM. The CPU sockets 7 compromise a number of CPU cores CPU core 1, CPU core 2, . . . CPU core m. Each CPU core has dedicated L1 cache and L2 cache. All CPU cores in a CPU socket 7 sharing a last level cache, LLC, which is accessed via an interconnect (e.g., a ring bus or mesh). The LLC includes different slices, Slice 1, Slice 2, . . . Slice n. The Slice selection function 40 is responsible for mapping the different portions of the memory 30 to different slices. The memory management unit (MMU) is in charge of translating the virtual memory address into the physical memory address, and it is mainly associated with the CPU elements, either by being implemented as part of the CPU or as a separate circuit. The MMU uses the page table 70 to translate the virtual address to physical address. The page table can be partially implemented in software, e.g., OS 80 and partially in HW, e.g., the TLB inside the MMU. The OS 80 is running on a server 5 that can host different applications; Application 1, Application 2, etc. The applications can be pinned to only use one core in the system, but can be moved, i.e., migrated from one CPU core to another if decided by the system. The Memory allocator is an entity that is responsible for allocating memory from available physical memory to an application upon application requests. It is implemented as part of OS 80, but can be implemented in HW as part of server 7 or partly in OS 80 and partly in HW.

The new functionality, the Accelerator function mentioned above, may be included to be able to handle runtime optimization of data placement in a physical memory with the notion of how different portions of physical memory are mapped to different slices in LLC and information about which core is accessing a data. The Accelerator function may for example be responsible for monitoring memory portions for a given application/process/CPU core, keeping information regarding allocated portions of physical memory and their addressing, keeping information regarding free portions of physical memory and their addressing as well as performing the migration of data. It may also be responsible to pre-allocating a suitable memory portion for given data, i.e., by communicating with a Memory allocator and a Slice selection function. This function may further be responsible for updating the page table. After the data migration to a new physical location in the main memory, the application requests will be re-routed to the new (suitable) physical memory block. The Accelerator function will enhance the system performance by moving a "hot" data, e.g., data accessed frequently or at a high rate, or related to high priority application, at runtime to a suitable portion of the memory. By the suitable portion of physical memory is meant the portions that are mapped to the slices that are associated to the CPU core accessing that data. The Accelerator function can be implemented as a node in HW, e.g., FPGA, in software, e.g., as part of memory allocator function of OS, or partially in HW and partially in software.

The Accelerator function may be in contact with the MMU at each CPU core to get the information about the addresses that the core is accessing. Alternatively, another entity can provide such information, and is thus not limited to the MMU. The MMU is in contact with the memory management controller (MMC) which is responsible for managing physical memory in a system, e.g., for mirroring a data and data migration. The MMC is in turn in contact with the Slice selection function to identify the mapping between a different portions, or blocks, of memory and different LLC slices.

Figure 10:
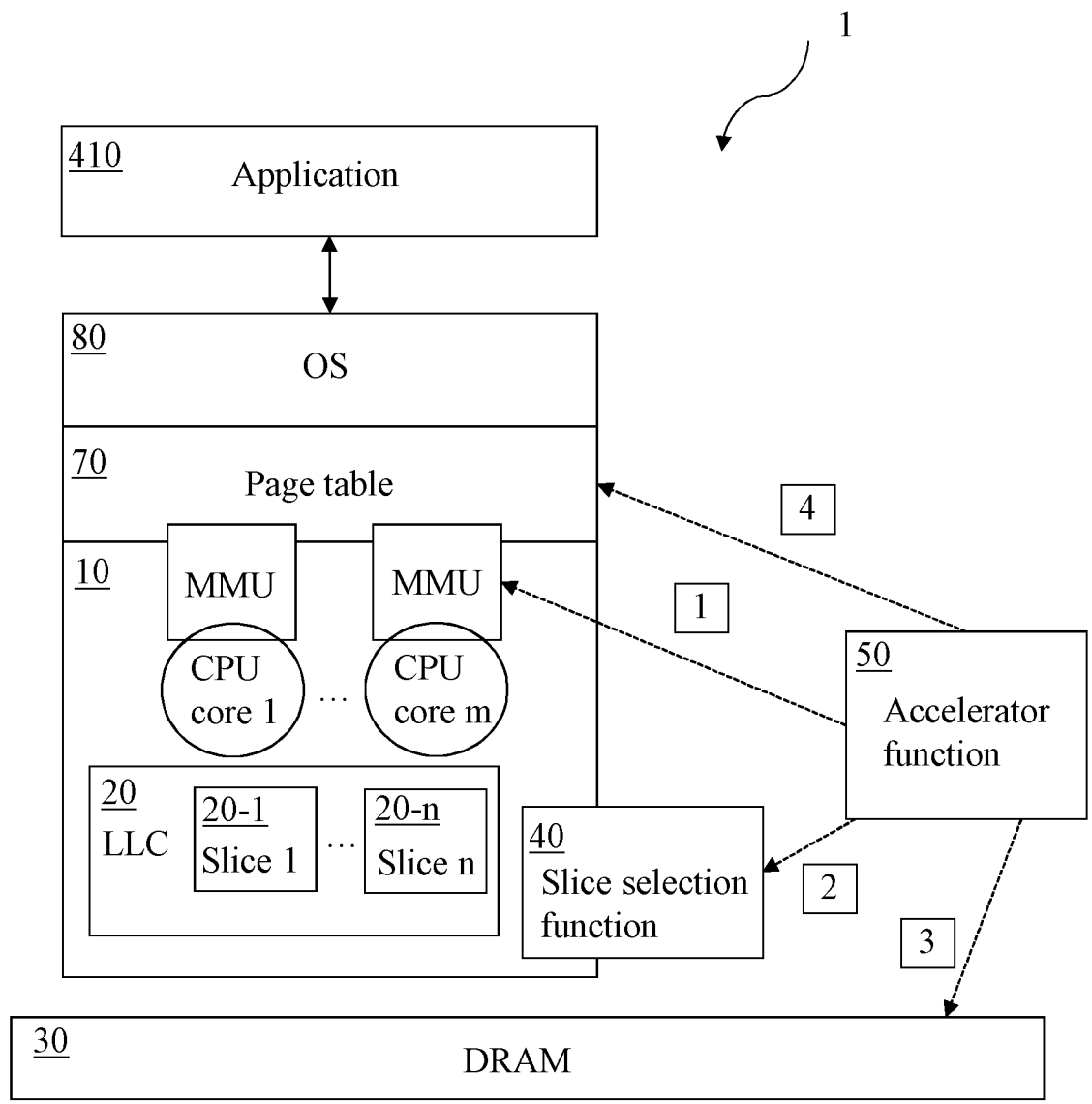
FIG. 10 is a schematic block diagram illustrating a further exemplary processing system in accordance with one or more aspects described herein.

An example showing how the solution may work will now be described with reference to FIG. 10, in which the memory portions are in the form of memory blocks and the PUs are CPU cores. The Accelerator function 50 keeps a table that includes information about available memory blocks and allocated memory blocks of memory 30, with their exact locations and addresses. The Accelerator function 50 also keeps a table containing information about which of CPU core 1 to CPU core m of the processor 10 it should monitor. The list of CPU cores to be watched can be configured at runtime by any entity, e.g., a new user entering a system and want to use this service.

The Accelerator function 5 monitors the different memory blocks that each CPU core in the list accesses and keeps the information about the access rate for each memory block. This information may be provided by the MMU or another entity in a system; Step 1 in FIG. 10. This information will be used to identify frequently used data in physical memory which may be referred to as "hot" data points.

When Accelerator function 50 identifies a hot memory block, it communicates with the Slice selection function 40 to evaluate whether the hot data is in a suitable portion of the physical memory or not. If needed, the Accelerator function decides on migrating a hot block of memory to another block which is mapped to a slice in the LLC to which the CPU core has less access time. The Accelerator function 50 finds a new block from the available physical memory that is mapped to right LLC slice. In this step, the Accelerator function 50 evaluates the mapping between the candidate memory blocks, i.e., from available free memory blocks in its memory table, by contacting the 40 Slice selection function; Step 2. Alternatively, the Accelerator function may request such information when querying the MMU in Step 1, and saves the query result for later use.

After finding a suitable memory block, the Accelerator function 5 initiates the data migration; Step 3. Thus, the hot data will be moved to the suitable block of memory that is mapped to the LLC slice(s) associated with, e.g., directly connected to, the CPU core requesting that data.

Finally, the Accelerator function 5 updates a page table 70 of the system, thus updating the OS 80, and if needed the MMU TLB, regarding the new physical location of the data; Step 4.

Next time, when application request that hot data, the system will look into the page table and the request will be routed to the new physical location of data. As the new location is mapped to a suitable LLC slice, the data will be more quickly available to the CPU core and Application requesting that data, which will therefore experience less waiting time for data. This results in faster response time from the application/process.

Figure 11:
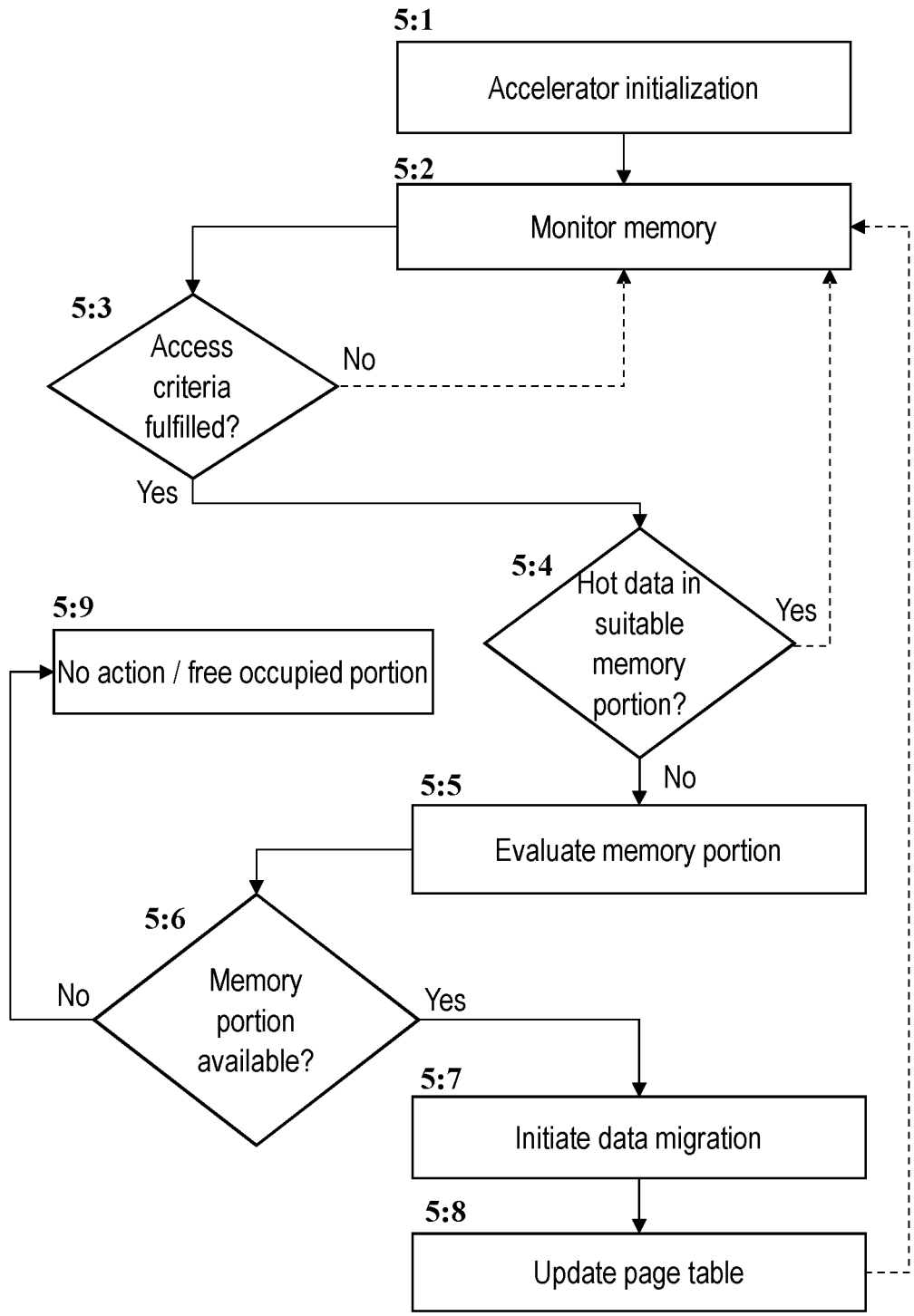
FIG. 11 is an exemplary flowchart depicting an exemplary process performed by processing system in accordance with one or more aspects described herein.

FIG. 11 represents a flowchart of the related steps of the processing system described in the previous sections. It should be mentioned that this is only one exemplary way of implementing this idea and the proposed technology is not limited to the shown steps.

5:1 The procedure starts with initialization of the Accelerator function 50. For instance, the memory table may be updated, e.g., checking free and occupied memory portions, and the processing units to be monitored may be registered;

5:2 The memory is monitored according to certain rules and procedures, e.g., access and rate of access for selected, or each, processing unit as determined by the initialization. For example, the addresses accessed by one or more specific processing units may be monitored to obtain the access rate of individual addresses accessed by the PUs. The monitoring may thus, an example, be performed per PU, e.g., by an MMU associated with the individual PUs, or on a processing system level by a monitoring function common to the PUs. Such monitoring function may be included in an Accelerator function as described in connection with FIG. 10;

5:3 The system checks whether an access criteria is fulfilled, e.g., whether the access rate exceeds a threshold value. The system may hence as an example, based on information provided by the monitoring function, compare the access rate of a memory address to the threshold value. If Yes, i.e., the access criteria is fulfilled, the next step is 5:4. If No the procedure returns to 5:2;

5:4 In this step, there is a check whether the data is located in a suitable memory portion. As an example, data that is frequently accessed by a processor unit running an application, may preferably be located in a memory portion associated with a specific cache portion from which the processing unit easily can fetch the data, i.e., with shortest possible access time. Thus, the data should preferably be copied to a cache portion associated with the processing unit running the application. If Yes, i.e., the data is already in a suitable memory portion, the procedure returns to 5:2. If No the procedure continues at 5:5;

5:5 The procedure now evaluates free memory portions, e.g., by contacting the slice selection function 40;

5:6 The next step is to determine whether a suitable memory portion is found. If Yes, the procedure continues at 5:7. If No the procedure continues at 5:9;

5:7 In this step, a migration of data is initiated, resulting in the data being migrated to the suitable location in the memory 30, i.e., to the memory portion found in the previous step;

5:8 After migration, the OS page table is updated with the new physical address of the migrated data, and if necessary, also the MMU TLB. The procedure then returns to step 5:2;

5:9 The procedure is stopped, and no further action is performed. As an alternative, the procedure may continue by freeing up a memory portion that is occupied by other data, e.g., migrating the other data from the wanted memory portion to another memory portion;

As indicate by the dashed arrows in FIG. 11, the procedure may continue monitoring the memory by returning to step 5:2 after steps 5:3, 5:4, and 5:8, respectively, have been completed. However, as an alternative, the procedure may in certain situations instead terminate after either of these steps, for example when the activity of a PU is considered completely mapped and/or the level of optimization is sufficient.

Terminating the procedure for one or more PUs running applications on the processing system thus reduces unnecessary load on the system.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 12:
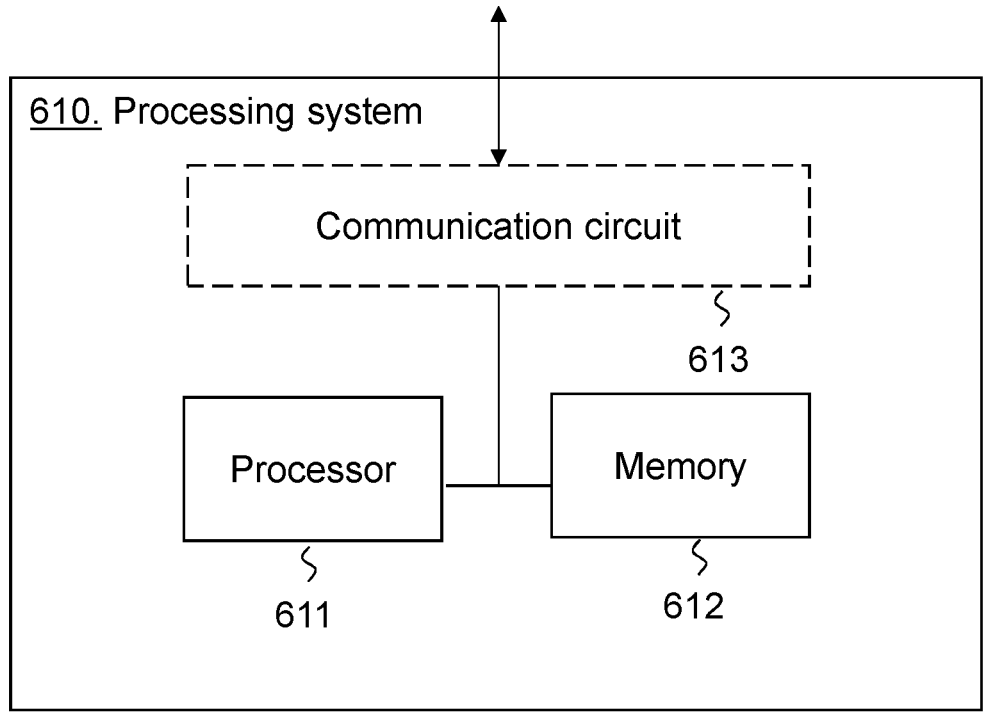
FIGS. 12-16 are illustrations of processing systems, respectively, in accordance with various aspects described herein.

FIG. 12 is a schematic block diagram illustrating an example of a processing system 610 based on a processor-memory implementation according to an embodiment. In this particular example, the processing system 610 comprises a processor 611 and a memory 612, the memory 612 comprising instructions executable by the processor 611, whereby the processor is operative detect that a data access criteria of the second memory portion is fulfilled; establish that first data stored in the second memory portion is related to a first application running on the first processing unit; allocate at least a part of the first memory portion to the first application based on cache information; and to migrate the first data to the at least part of the first memory portion.

Optionally, the processing system 610 may also include a communication circuit 613. The communication circuit 613 may include functions for wired and/or wireless communication with other devices and/or systems, e.g., in a network. In a particular example, the communication circuit 613 may be based on circuitry for communication with one or more other nodes, including transmitting and/or receiving information. The communication circuit 613 may be interconnected to the processor 611 and/or memory 612. By way of example, the communication circuit 863 may include any of the following: a receiver, a transmitter, a transceiver, input/output (I/O) circuitry, input port(s) and/or output port(s).

Figure 13:
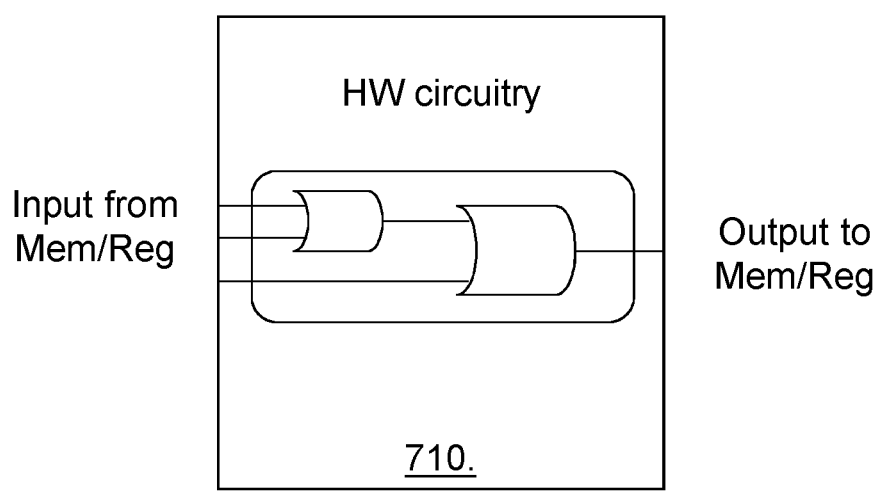

FIG. 13 is a schematic block diagram illustrating another example of a processing system 710 based on a hardware circuitry implementation according to an embodiment. Examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (Reg), and/or memory units (Mem).

Figure 14:
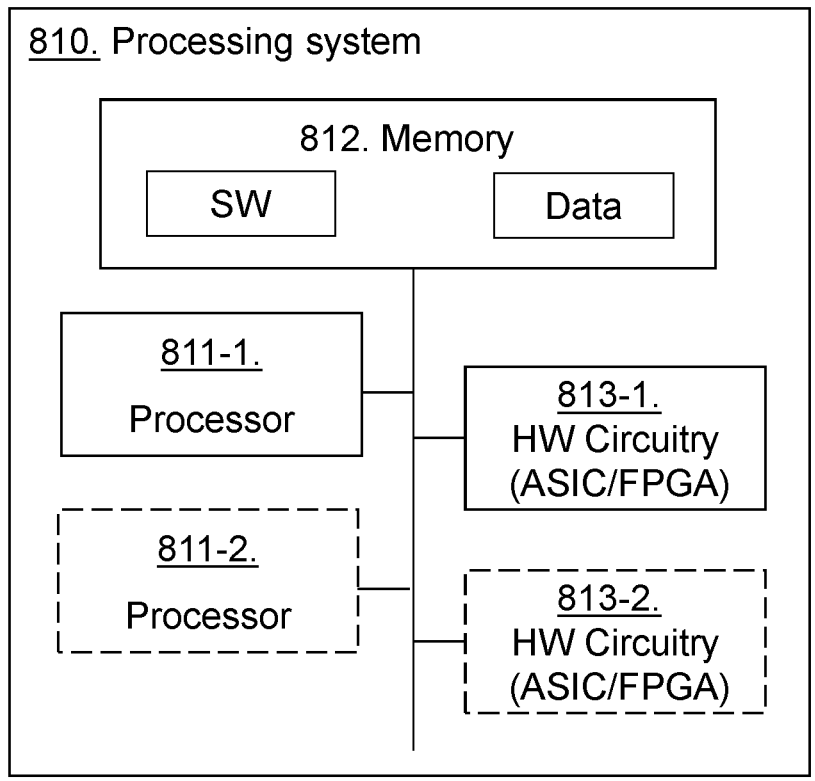

FIG. 14 is a schematic block diagram illustrating yet another example of a processing system 810, based on combination of both processor(s) 811-1, 811-2 and hardware circuitry 813-1, 813-2 in connection with suitable memory unit(s) 182. The processing system 810 comprises one or more processors 811-1, 811-2, memory 812 including storage for software and data, and one or more units of hardware circuitry 813-1, 813-2 such as ASICs and/or FPGAs. The overall functionality is thus partitioned between programmed software (SW) for execution on one or more processors 811-1, 811-2, and one or more pre-configured or possibly reconfigurable hardware circuits 813-1, 813-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 15:
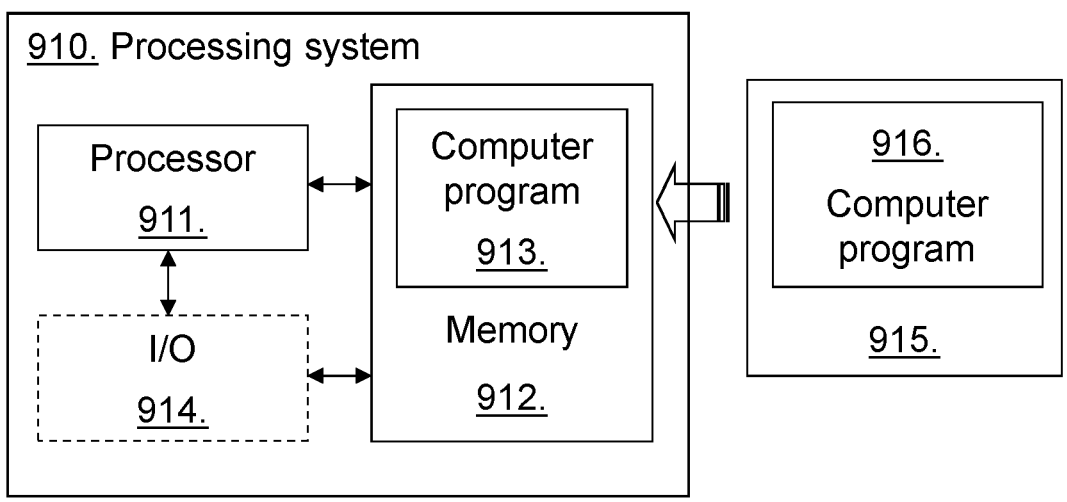

FIG. 15 is a schematic diagram illustrating an example of a computer-implementation of a processing system 910, according to an embodiment. In this particular example, at least some of the steps, functions, procedures, modules and/or blocks described herein are implemented in a computer program 913; 916, which is loaded into the memory 912 for execution by processing circuitry including one or more processors 911. The processor(s) 911 and memory 912 are interconnected to each other to enable normal software execution. An optional input/output device 914 may also be interconnected to the processor(s) 911 and/or the memory 912 to enable input and/or output of relevant data such as input parameter(s) and/or resulting output parameter(s).

The processing circuitry including one or more processors 911 is thus configured to perform, when executing the computer program 913, well-defined processing tasks such as those described herein.

In a particular embodiment, the computer program 913; 916 comprises instructions, which when executed by at least one processor 911, cause the processor(s) 911 to detect that a data access criteria of the second memory portion is fulfilled; establish that first data stored in the second memory portion is related to a first application running on the first processing unit; allocate at least a part of the first memory portion to the first application based on cache information; and to migrate the first data to the at least part of the first memory portion.

The term 'processor' should be interpreted in a general sense as any system or device capable of executing program code or computer program instructions to perform a particular processing, determining or computing task.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 913; 916 may be realized as a computer program product, which is normally carried or stored on a computer-readable medium 912; 915, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 16:
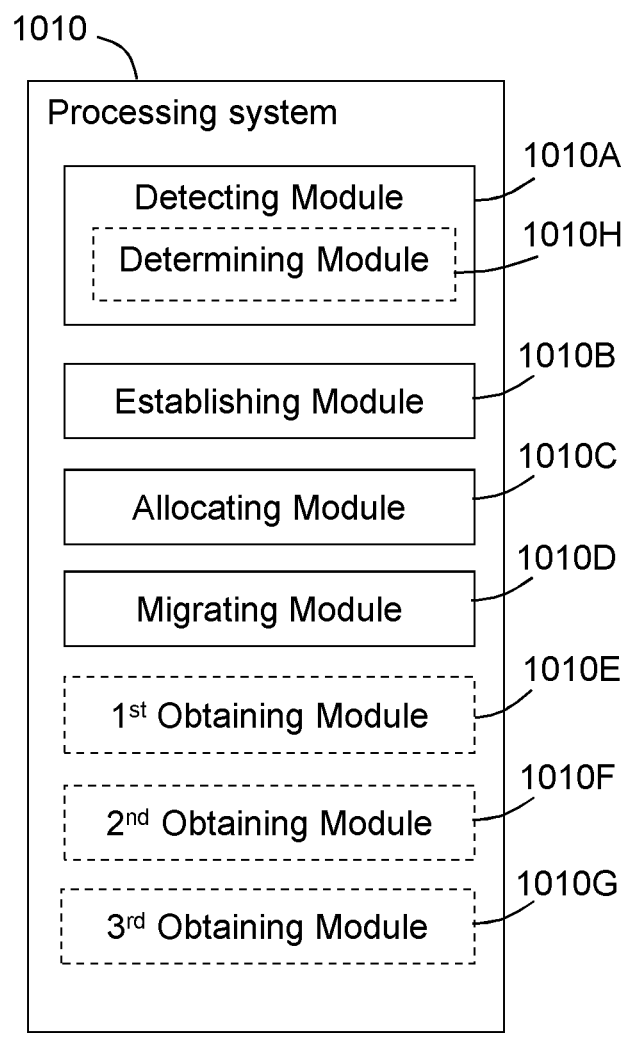

FIG. 16 is a schematic diagram illustrating an example of a processing system 1010, for handling memory, the processing system comprises a detecting module 1010A for detecting that a data access criteria of the second memory portion is fulfilled; an establishing module 1010B for establishing that first data stored in the second memory portion is related to a first application running on the first processing unit; an allocating module 1010C for allocating at least a part of the first memory portion to the first application based on cache information; and a migrating module 1010D for migrating the first data to the at least part of the first memory portion.

Optionally, the processing system 1010 further comprises a first obtaining module 1010E for obtaining cache information comprising the association between the first memory portion and the first cache portion, and the association between the first processing unit and the first cache portion.

Optionally, the processing system 1010 further comprises a second obtaining module 1010F for obtaining at least one of first relationship information, comprising a relationship between the first application and the first data, and second relationship information, comprising a relationship between the first application and the first processing unit, and the establishing that first data stored in the second memory portion is related to a first application running on the first processing unit, is based on one or both of said first relationship information and said second relationship information.

The processing system 1010 optionally further comprises a third obtaining module 1010G for obtaining access information relating to the second memory portion, and said detecting that a criteria is fulfilled, is based on the access information. The detecting module 1010A may then further comprise a determining module 1010H for determining that the accesses information exceeds the threshold value.

Alternatively, it is possible to realize the module(s) in FIG. 16 predominantly by hardware modules, or alternatively by hardware, with suitable interconnections between relevant modules. Examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for handling memory in a multi-core processing system, said processing system comprising a processor comprising at least a first processing unit and a second processing unit, a cache, common to the first processing unit and the second processing unit, comprising a first cache portion associated with the first processing unit and a second cache portion associated with the second processing unit, and a memory, comprising a first memory portion associated with the first cache portion and a second memory portion associated with the second cache portion, the method comprising:
   detecting that a data access criteria of the second memory portion is fulfilled;
   establishing that first data stored in the second memory portion is related to a first application running on the first processing unit;
   allocating at least a part of the first memory portion of the memory to the first application based on cache information; and
   migrating the first data to the at least part of the first memory portion allocated to the first application.

2. The method according to claim 1, further comprising:
   obtaining cache information comprising the association between the first memory portion and the first cache portion, and the association between the first processing unit and the first cache portion.

3. The method according to claim 2, further comprising:
   obtaining at least one of first relationship information, comprising a relationship between the first application and the first data, and second relationship information, comprising a relationship between the first application and the first processing unit,
   wherein said establishing that the first data stored in the second memory portion is related to a first application running on the first processing unit, is based on one or both of said first relationship information and said second relationship information.

4. The method according to claim 3, further comprising:
   obtaining access information relating to the second memory portion, wherein said detecting that the data access criteria is fulfilled, is based on said access information.

5. The method according to claim 4, wherein the access information comprises an indication of a frequency of access to the first data stored in the second memory portion.

6. The method according to claim 4, wherein the access information comprises an indication of a frequency of access to the first data stored in the second memory portion, and wherein the detecting further comprises determining that the indication of the frequency of accesses exceeds a threshold value.

7. The method according to claim 4, wherein the access information indicates a required latency limit associated with the first data.

8. The method according to claim 1, further comprising:
   establishing that the first memory portion is allocated to a second application running on the second processing unit;
   allocating a third memory portion to the second application;
   migrating second data related the second application to the third memory portion.

9. The method according to claim 1, wherein the first cache portion comprises a primary cache portion associated with a primary memory portion of the first memory portion and a secondary cache portion associated with a secondary memory portion of the first memory portion, the method further comprising:
   establishing that the primary memory portion is allocated to a second application running on the second processing unit;
   allocating the secondary memory portion to the first application based on cache information; and
   migrating the first data to the secondary memory portion.

10. A processing system comprising:
    a processor comprising at least a first processing unit and a second processing unit;
    a cache, common to the first processing unit and the second processing unit, comprising a first cache portion associated with the first processing unit and a second cache portion associated with the second processing unit; and
    a memory, comprising a first memory portion associated with the first cache portion and a second memory portion associated with the second cache portion;
    wherein the processing system to:
    detect that a data access criteria of the second memory portion is fulfilled;
    establish that first data stored in the second memory portion is related to a first application running on the first processing unit;
    allocate at least a part of the first memory portion of the memory to the first application based on cache information; and
    migrate the first data to the at least part of the first memory portion allocated to the first application.

11. The processing system according to claim 10, wherein the processing system further to:

obtain cache information comprising the association between the first memory portion and the first cache portion, and the association between the first processing unit and the first cache portion.

12. The processing system according to claim 11, further to:
obtain at least one of first relationship information, comprising a relationship between the first application and the first data, and second relationship information, comprising a relationship between the first application and the first processing unit,
wherein to establish that the first data stored in the second memory portion is related to a first application running on the first processing unit, is based on one or both of said first relationship information and said second relationship information.

13. The processing system according to claim 12, further configured to:
obtain access information relating to the second memory portion, wherein to detect that the data access criteria is fulfilled, is based on said access information.

14. The processing system according to claim 13, wherein the access information comprises an indication of a frequency of access to the first data stored in the second memory portion.

15. The processing system according to claim 13, wherein the access information comprises an indication of a frequency of access to the first data stored in the second memory portion, and wherein to detect further comprises to determine that the indication of the frequency of accesses exceeds a threshold value.

16. The processing system according to claim 13, wherein the access information indicates a required latency limit associated with the first data.

17. The processing system according to claim 10, further to:
establish that the first memory portion is allocated to a second application running on the second processing unit;
allocate a third memory portion to the second application;
migrate second data related to the second application to the third memory portion.

18. The processing system according to claim 10, wherein the first cache portion comprises a primary cache portion associated with a primary memory portion of the first memory portion, and a secondary cache portion associated with a secondary memory portion of the first memory portion, the processing system further to:
establish that the primary memory portion is allocated to a second application running on the second processing unit;
allocate the secondary memory portion to the first application based on cache information; and
migrate the first data to the secondary memory portion.

19. The processing system of claim 10 further comprising an accelerator to accelerate operations to detect, establish, allocate and migrate.

20. A non-transitory computer-readable storage medium comprising instructions which, when executed by at least one processor, cause a multi-core processing system, comprising a processor comprising at least a first processing unit and a second processing unit, a cache, common to the first processing unit and the second processing unit, comprising a first cache portion associated with the first processing unit and a second cache portion associated with the second processing unit, and a memory, comprising a first memory portion associated with the first cache portion and a second memory portion associated with the second cache portion, to perform memory handling operations comprising:
detecting that a data access criteria of the second memory portion is fulfilled;
establishing that first data stored in the second memory portion is related to a first application running on the first processing unit;
allocating at least a part of the first memory portion of the memory to the first application based on cache information; and
migrating the first data to the at least part of the first memory portion allocated to the first application.

* * * * *